(12) United States Patent
Ikeda et al.

(10) Patent No.: US 7,161,739 B2
(45) Date of Patent: Jan. 9, 2007

(54) OPTICAL SYSTEM, OPTICAL DEVICE INCLUDING THE SAME, AND OPTICAL DEVICE DESIGNING METHOD

(75) Inventors: Yuji Ikeda, Mitaka (JP); Michiko Takushima, Yokohama (JP); Norihide Takeyama, Mitaka (JP)

(73) Assignees: Genesia Corporation, Tokyo (JP); Sumitomo Electric Industries, Ltd., Osaka (JP)

( * ) Notice: Subject to any disclaimer, the term of this patent is extended or adjusted under 35 U.S.C. 154(b) by 517 days.

(21) Appl. No.: 10/793,334

(22) Filed: Mar. 5, 2004

(65) Prior Publication Data

US 2004/0228000 A1 Nov. 18, 2004

(30) Foreign Application Priority Data

Mar. 6, 2003 (JP) ............................ P2003-060486

(51) Int. Cl.
*G02B 1/00* (2006.01)
(52) U.S. Cl. ....................................... 359/642; 359/646
(58) Field of Classification Search ................ 359/642, 359/646, 572–577, 566, 569, 558, 726, 628
See application file for complete search history.

(56) References Cited

U.S. PATENT DOCUMENTS 5,040,886 A * 8/1991 Gunter ........................ 359/434
5,946,141 A * 8/1999 Harrigan ..................... 359/642

OTHER PUBLICATIONS

D. M. Marom et al.; "Wavelength-Selective 1×4 Switch for 128 WDM Channels at 50 GHz Spacing"; *OFC 2002 Postdeadline Papers*; c. 2002; pp. FB7-1-FB7-3; Optical Society of America; USA.

* cited by examiner

*Primary Examiner*—Timothy Thompson
*Assistant Examiner*—M. Hasan
(74) *Attorney, Agent, or Firm*—McDermott Will & Emery LLP (57) ABSTRACT

The present invention relates to an optical device having a structure that can make the diameter of the emitted Gaussian beam smaller. The optical device is arranged between a first and second positions, and comprises a first and second optical systems separated with a focus on an intermediate position between the first and second positions. The first optical system, arranged between the first and intermediate positions, comprises a first light entrance surface on which a Gaussian beam having a beam waist, whose radius becomes $w_0$ at the first position, is incident, and a first light emission surface from which a Gaussian beam having a beam waist, whose radius becomes $w_1$ at the intermediate position, is emitted. The second optical system, arranged between the intermediate and second positions, comprises a second light entrance surface on which the Gaussian beam emitted from the first optical system is incident, and a second light emission surface from which a Gaussian beam having a beam waist, whose radius becomes $w_2$ at the second position, is emitted. The radial ratio of the beam waists ($w_2/w_0$) is set so as to become smaller than a geometrical-optical lateral magnification of the optical device.

19 Claims, 4 Drawing Sheets

OPTICAL SYSTEM, OPTICAL DEVICE INCLUDING THE SAME, AND OPTICAL DEVICE DESIGNING METHOD

REARGROUND OF THE INVENTION

1. Field of the Invention

The present invention relates an optical system emitting/entering a Gaussian beam, an optical device including the optical system, and a method of designing the optical device.

2. Related Background Art

In general, many of optical devices used in the field of optical communications enter the light emitted from an end face of one optical fiber, performs a certain processing to the entered light, and emit the processed light onto an end face of the other optical fiber.

For example, the optical device, described in the document: D. M. Marom, et al., "Wavelength-selective 1×4 switch for 128 WDM channels at 50 GHz spacing", OFC2002 Postdeadline Papers, FB7 (2002), is one used as an optical switch in a WDM (Wavelength Division Multiplexing) optical communication system, and it enters the light emitted from an one optical fiber end face of an entrance port, diffracts the entered light by a diffraction grating every wavelength components, and emits the diffracted wavelength components onto other optical fiber end faces of an emission port. Specifically, the light propagating from the entrance port to the emission port passes through in the order of a first optical system, a diffraction grating, a second optical system, a mirror reflector, the second optical system, the diffraction grating, and the first optical system. In the following, the optical path from the optical fiber end face of the entrance port to the mirror reflector is called as "approach route", and the optical path from the mirror reflector to one optical fiber end face of the emission port is called as "return route". The light in the approach route and the light in the return route propagate through the common optical system in the opposite direction mutually.

In the approach route, the first optical system collimates the light emitted from the optical fiber end face of the entrance port, and introduces the collimated light onto the diffraction grating. On the other hand, in the return route, the first optical system collects the wavelength components diffracted by the diffraction grating onto the optical fiber end faces of the emission port. The second optical system, in the approach route, collects the wavelength components diffracted by the diffraction grating onto the mirror reflector. After this, the second optical system, in the return route, collimates the wavelength components reflected by the mirror reflector and introduces the collimated wavelength components onto the diffraction grating.

In addition, in the optical device of the above-mentioned document, the second optical system overlaps a part of the first optical system. The mirror reflector, arranged at the turning point from the approach route to the return route, comprises plurality of reflecting elements respectively prepared every associated wavelength component (channel) to be diffracted by the diffraction grating, and the reflecting surface of each reflecting element can be varied. The emission port also comprises plurality of fiber elements respectively prepared every associated channel.

SUMMARY OF THE INVENTION

The inventors have studied conventional optical devices in detail and, and as a result, have found problems as follows. Namely, the conventional optical device as described above is required to be small. Therefore, as a mirror reflector, whose reflecting surface can be varied, one manufactured by MEMS (Micro Electro Mechanical Systems) technology is used. In addition, the conventional optical device is required to have a broader wavelength bandwidth per one channel, and is also required to have a number of channels (in other words, have a number of entrance/emission ports). However, in the conventional optical device, there is a limit to satisfy these requirements. The reasons will be explained to the following in detail.

The light, having emitted from the optical fiber end face of the emission port, is a Gaussian beam having a beam waist at the optical fiber end face. When setting the radius of the beam waist at $w_0$, the focal length of the first optical system at $f_0$, and the focal length of the second optical system at $f_1$, the radius of the beam collected onto the mirror reflector can be calculated from the theory of geometrical optics and is defined by $w_0(f_1/f_0)$. In addition, when setting a diffracting angle difference between wavelength components apart from each other at one channel spacing in the diffraction grating at $\theta$, the spacing between positions where the beams of channels collected by the second optical system becomes $f_1 \tan \theta$, and therefore the width of each mirror reflector can be reduced by the spacing between the beam collected positions.

From these matters, in order to make the wavelength bandwidth per one channel become small sufficiently, it is necessary to sufficiently reduce the radius ($w_0(f_1/f_0)$) of each beam collected onto the associated mirror reflector rather than the spacing ($f_1 \tan \theta$) between the beam collected positions for channels. In other words, it is necessary to make $w_0/(f_0 \tan \theta)$ small enough than 1. In order to satisfy this condition, it can be considered to increase the focal length $f_0$ of the first optical system.

However, in this situation, the diameter of beam which is emitted from the optical fiber end face of entrance port and which is collimated by the first optical system becomes large. Accordingly, the second optical system is required to have a very large numerical aperture or to have a long focal length $f_1$. It is difficult to obtain the second optical system having a very large numerical aperture, and on the other hand, the use of the second optical system having a long focal length $f_1$ causes the enlargement of optical devices. That is, both of the increase of numerical aperture and the expansion of focal length are not realistic.

In addition, as increasing the number of entrance/emission ports, the diameter of beam between the first optical system and the diffraction grating becomes larger. That is, the same problem as described above will be occurred. As mentioned the document, the maximum number of entrance/emission ports may be limited to five or six.

With the foregoing in view, it is an object of the present invention to provide an optical system capable of reducing the diameter of Gaussian beam to be emitted, an optical device including the optical system, and a method of designing the optical device.

An optical system according to the present invention is provided between a first and second positions apart form each other at a predetermined distance, and comprises a light entrance surface facing the first position and a light emission surface facing the second position. The light entrance surface includes a lens surface on which a Gaussian beam, having a beam waist with a radius of $w_1$ at the first position, is incident. The light emission surface includes a lens surface from which a Gaussian beam, having a beam waist with a radius of $w_2$ at the second position, is emitted. In particular, the optical system according to the present invention is characterized in that a radial ratio ($w_2/w_1$) of the beam waists at the first and second positions is smaller than a geometrical-optical lateral magnification of the optical system. Since this optical system can make the diameter of Gaussian beam to be emitted becomes smaller, the wavelength bandwidth per one channel can be broadened and the number of entrance/emission ports can be increased even though the size of the optical system is small. To satisfying the above-mentioned beam waist radial ratio, this optical system preferably comprises a front optical system and a rear optical system apart from each other at a predetermined distance.

In addition, an optical device according to the present invention comprises a first optical system provided between a first and second positions apart from each other at a predetermined distance, and a second optical system provided between the first optical system and the second position. Here, the first optical system has a first light entrance surface facing the first position and a first light emission surface facing an intermediate position between the first and second optical system. The first light entrance surface includes a lens surface on which a Gaussian beam, having a beam waist with a radius of $w_0$ at the first position, is incident. The first light emission surface includes a lens surface from which a Gaussian beam, having a beam waist with a radius of $w_1$ at the intermediate position, is emitted. On the other hand, the second optical system has a second light entrance surface facing the intermediate position, and a second light emission surface facing the second position. The second light entrance surface includes a lens surface on which the Gaussian beam emitted from the first optical system is incident. The second light emission surface includes a lens surface from which a Gaussian beam, having a beam waist with a radius of $w_2$ at the second position, is emitted. In particular, the optical device is characterized in that a radial ratio ($w_2/w_0$) of the beam waists at the first and second positions is smaller than a total geometrical-optical lateral magnification of the first and second optical systems. Since this optical device can make the diameter of Gaussian beam to be emitted become smaller, the wavelength bandwidth per one channel can be broadened and the number of entrance/emission ports can be increased even though the size of the optical system is small. Also, in the optical device according to the present invention, the beam waist of Gaussian beam emitted form the first optical system exists at the intermediate position between the first and second optical system, and therefore other optical elements can be preferably inserted at this position. To satisfying the above-mentioned beam waist radial ratio, the second optical system preferably comprises a front optical system and a rear optical system apart from each other at a predetermined distance.

The optical system according to the present invention includes plurality of lenses, and a total transmission loss of the lenses only is preferably 0.7 dB or less in C-band (1530 nm–1565 nm). In this case, even though other optical elements such as a wavelength demultiplexer are inserted, the optical device becomes to have a sufficiently small transmission loss and reflection loss as a while, and therefore can be preferably used in an optical communication, and the like.

In the optical system according to the present invention, it is preferable that a position and a radius of the beam waist of the Gaussian beam emitted from the rear optical system are respectively set on the basis of the product of a distance from the front optical system to the rear optical system and a refracting power of the rear optical system. In addition, each of the front and rear optical systems preferably has a positive refracting power. These cases are suitable because the beam waist radius ratio of the entered and emitted Gaussian beams can be made become smaller than a geometrical-optical lateral magnification of the optical device.

Also, in the optical system according to the present invention, it is preferable that a principle ray of the Gaussian beam emitted from the rear optical system is in parallel with an optical axis of the rear optical system. In this case, other optical elements can be provided at the second position where the beam waist of the emitted Gaussian beam exists.

It is preferable that the optical device according to the present invention further comprises a mirror reflector, and a third optical system. The mirror reflector is provided at the second position and functions so as to reflect the Gaussian beam, emitted from the second optical system, toward the second optical system again. The third optical system is provided at a position where the Gaussian beam, having passed through said second optical system after being reflected by the mirror reflector, reaches. The third optical system comprises a third light entrance surface on which the Gaussian beam reflected by the mirror reflector is incident, and a third light emission surface from which a Gaussian beam having a beam waist at a third position different from the second position is emitted. Specifically, the optical device according to the present invention is characterized in that a principle ray of the Gaussian beam emitted from the third optical system is in parallel with an optical axis of the third optical system. In this case, when the Gaussian beam with a beam waist existing at the first position is entered into the optical device, the entered beam reaches the mirror reflector through the first and second optical systems, and forms a beam waist at the position (second position) where the mirror reflector is arranged. The beam reflected by the mirror reflector reaches the third position through the second and third optical systems, and forms a beam waist at the third position. Here, the optical axis of the third optical system is not necessary to correspond to the optical axis of the first optical system and is set so as to be in parallel with the principle ray of the Gaussian beam emitted from the third optical system, and therefore a superior optical coupling coefficient can be realized.

It is preferable that the optical device according to the present invention further comprises a wavelength demultiplexer provided between the first and second optical systems. In addition, the wavelength demultiplexer preferably includes a diffraction grating. In this case, the optical device according to the present invention can function as an optical demultiplexer or an optical multiplexer.

On the other hand, it is preferable that the optical device according to the present invention further comprises plurality of mirror reflectors prepared for the associated wavelength components demultiplexed by the wavelength demultiplexer, and plurality of third optical systems. The mirror reflectors are provided at positions where respectively correspond to the second position for each of the wavelength components, and the mirror reflectors respectively reflect the Gaussian beams of the associated wavelength components, having emitted from the second optical system, toward the second optical system again. The third optical systems are provided at positions where the Gaussian beams of the wavelength components, having passed through the second optical system and the wavelength demultiplexer after being respectively reflected by the associated mirror reflectors, respectively reach. Each of the third optical systems comprises a third light entrance surface on which the Gaussian beams of the associated wavelength components, having passed through the second optical system again from the associated mirror reflector, are incident, and a third light emission surface from which Gaussian beam of the associated wavelength component having a beam waist at a third position are emitted. In this case, when the Gaussian beam with a beam waist existing at the first position is entered into the optical device, the beam is demultiplexed into wavelength components by the wavelength demultiplexer and thereafter the demultiplexed wavelength components respectively reach the associated mirror reflectors through the first and second optical systems. As a result, each of the beams of the wavelength components, having passed through the first and second optical systems, becomes to have a beam waist at the positions (second position) where the associated mirror reflectors are arranged. The beams reflected by the mirror reflectors respectively reach the associated third positions through the second optical system, the wavelength demultiplexer, and the third optical system, and respectively have beam waists at the associated third positions.

In the optical device according to the present invention, each of the mirror reflectors preferably has a reflecting surface whose tilted angle can be varied. In this case, the wavelength of the beam entered/emitted in each entrance/emission port can be varied. Also, the optical device according to the present invention preferably has seven or more entrance/emission ports. In this case, even though the optical device is small, the number of channels to be optically multiplexed/demultiplexed can be increased.

The optical device designing method according to the present invention is a method of designing an optical system, which comprises a front optical system and a rear optical system arranged so as to become apart from each other at a predetermined distance. The method calculates a distance ($d_1$) from the front optical system to the rear optical system and a refracting power ($P_2$) of the rear optical system, and setting a position and a radius of the beam waist of the Gaussian beam emitted from the rear optical system on the basis of the product ($d_1 \cdot P_2$) of the calculated distance and refracting power. In the optical device designing method, a position and a radius of the beam waist of the Gaussian beam emitted from the rear optical system is designed on the basis of the product ($d_1 \cdot P_2$). That is, the optical device, in which the beam waist radial ratio of the entered and emitted Gaussian beams is smaller than a geometrical-optical lateral magnification thereof, can be realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Embodiments of the optical system and the optical device according to the present invention will now be described in detail with reference to FIGS. 1, 2, 3A, 3B, and 4. In the descriptions of the drawings, identical comprising elements are denoted with identical reference numerals, for which redundant descriptions are omitted.

(First Embodiment)

Figure 1:
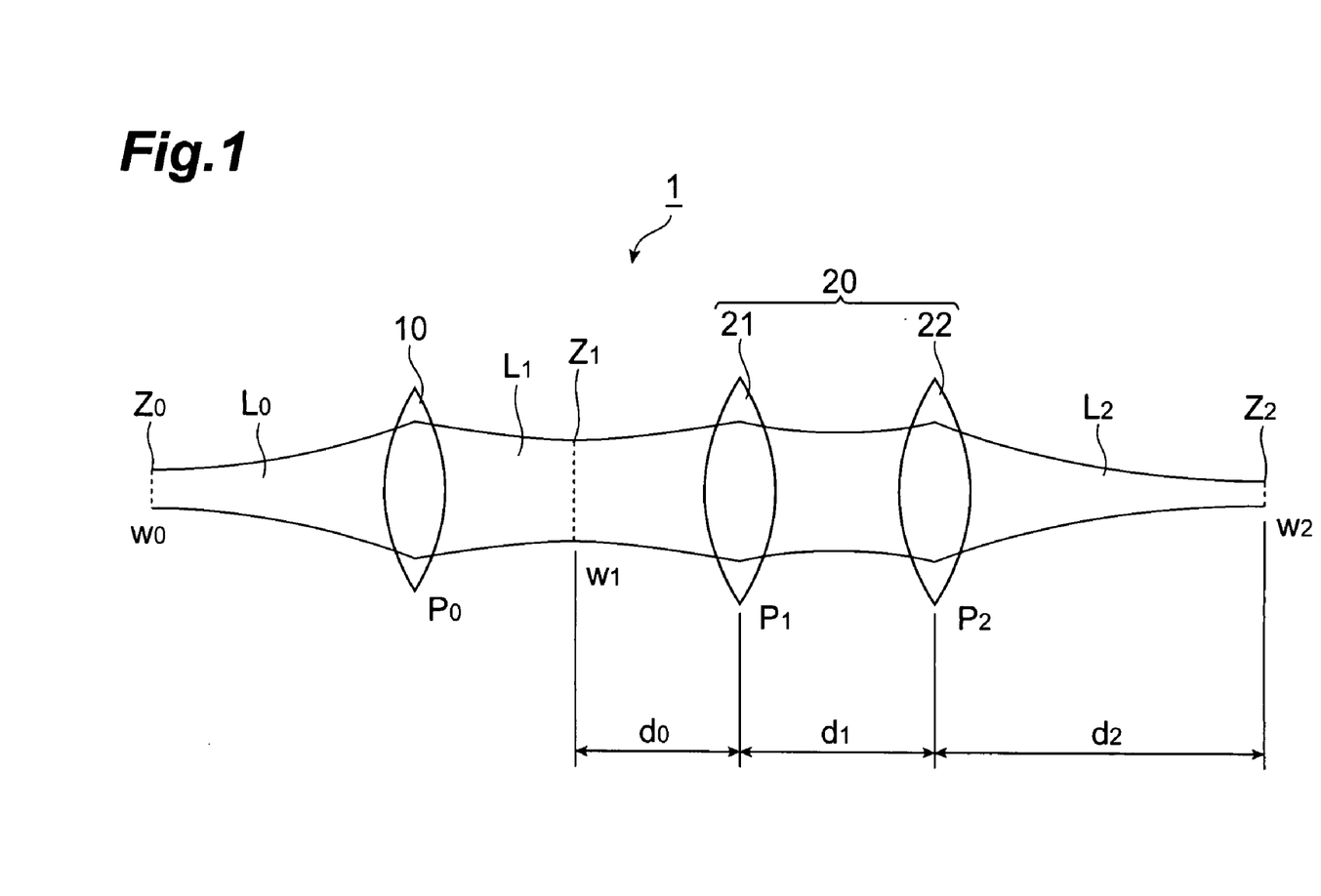
FIG. 1 is a view showing a configuration of an optical device of a first embodiment according to the present invention.

An optical device of a first embodiment according to the present invention will be explained as follows. FIG. 1 is a view showing a configuration of an optical device of a first embodiment according to the present invention.

The optical device 1, shown in FIG. 1, comprises a first optical system 10 and a second optical system 20 apart from each other at a predetermined distance. In addition, the second optical system 20 is divided into a front optical system 21 and a rear optical system 22 apart from each other at a predetermined distance.

The first optical system 10 has a first light entrance surface on which a Gaussian beam $L_0$ is incident, and a first light emission surface from which a Gaussian beam $L_1$ is emitted. The Gaussian beam $L_0$ has a beam waist whose radius becomes $w_0$ at the first position $Z_0$, and the Gaussian beam $L_1$ has a beam waist whose radius becomes $w_1$ at the intermediate position $Z_1$. The second optical system 20 is provided between the intermediate position $Z_1$ and the second position $Z_2$. The second optical system 20 has a second light entrance surface on which a Gaussian beam $L_1$ from the first optical system 10 is incident, and a second light emission surface from which a Gaussian beam $L_2$ is emitted. The Gaussian beam $L_2$ has a beam waist whose radius becomes $w_2$ at the second position $Z_2$.

In the first embodiment, the refracting power (reciprocal of focal length) of the first optical system 10 is set at $P_0$. In the second optical system 20, the refracting power of the front optical system 21 is set at $P_1$, and the refracting power of the rear optical system 22 is set at $P_2$. In addition, an optical distance between the intermediate position $Z_1$ and the front optical system 21 is set at $d_0$, an optical distance between the front optical system 21 and the rear optical system 22 is set at $d_1$, and an optical distance between the rear optical system 22 and the second position z2 is set at $d_2$.

In this case, a total refracting power P of the second optical system 20 is expressed by the following formula (1).

$$P = P_1 + P_2 - d_1 P_1 P_2 \quad (1)$$

On the other hand, a geometrical-optical lateral magnification $\beta$ of the optical device 1 and a geometrical-optical lateral magnification $\beta_{20}$ of the second optical system 20 are respectively expressed by the following formulas (2a) and (2b).

$$\beta = \frac{P_0}{P} \quad (2a)$$

-continued $$\beta_{20} = \frac{P_1}{P_2} \quad (2b)$$

Each of the optical device 1 and the second optical system 20 is characterized in that a beam waist radius ratio of the entered and emitted Gaussian beams is smaller than a geometrical-optical lateral magnification thereof, namely the following formulas (3a) and (3b) are realized.

$$\frac{w_2}{w_1} < \beta \quad (3a)$$

$$\frac{w_2}{w_1} < \beta_{20} \quad (3b)$$

In addition, when the first and second optical systems are respectively constituted by a single lens and arranged at confocal positions, the beam waist radius ratio of the entered and emitted Gaussian beams corresponds to a geometrical-optical lateral magnification. Also, at the case that these optical systems are not arranged at the confocal positions, when a focal length of the single lens is sufficiently long as compared with the beam waist radius ratio of the entered and emitted Gaussian beams, the beam waist radius ratio approximately corresponds to the geometrical-optical lateral magnification. That is, since the beam waist radius ratio of the entered and emitted Gaussian beams is uniquely determined from the ratio of refracting powers of the first and second optical system when both of the first and second optical systems are constituted by a single lens, it is difficult to use a lens having a long focal length as the second optical system and reduce a diameter of the emitted Gaussian beam.

In contrast, the beam waist radius ratio of the entered and emitted Gaussian beams in the optical device 1 according to the first embodiment is smaller than the geometrical-optical lateral magnification, as described in the above formulas (3a) and (3b). That is, the diameter of the emitted Gaussian beams can be made become smaller. This matter will be explained more in detail as follows.

The beam matrix is expressed by the following formula (4).

$$M = \begin{pmatrix} A & B \\ C & D \end{pmatrix} \quad (4)$$

Each element of this beam matrix is expressed by the following formulas (5a) to (5d).

$$A = 1 - d_1 P_1 + d_2(-P_1 - P_2 + d_1 P_1 P_2) \quad (5a)$$

$$B = d_0 + d_1 - d_0 d_1 P_1 + d_2 \{1 - d_0 P_1 - (d_0 + d_1) P_2 + d_0 d_1 P_1 P_2\} \quad (5b)$$

$$C = -P_1 - P_2 + d_1 P_1 P_2 \quad (5c)$$

$$D = 1 - d_0 P_1 - (d_0 + d_1) P_2 + d_0 d_1 P_1 P_2 = 1 - d_1 P_2 - d_0 P \quad (5d)$$

As using each element of this beam matrix, the beam waist radius ratio $(w_2/w_1)$ of the entered and emitted Gaussian beams in the second optical system 20 is expressed by the following formula (6).

$$\left(\frac{w_2}{w_1}\right)^2 = \frac{1}{\left(\frac{\pi w_1^2}{\lambda}\right)^2 C^2 + D^2} \quad (6)$$

In addition, the beam waist radius ratio $(w_1/w_0)$ of the entered and emitted Gaussian beams in the first optical system 10 is expressed by the following formula (7).

$$\left(\frac{w_1}{w_0}\right)^2 = \frac{1}{\left(\frac{\pi w_0^2}{\lambda}\right)^2 P_0^2} \quad (7)$$

From the above formulas (6) and (7), the beam waist radius ratio $(w_2/w_0)$ of the entered and emitted Gaussian beams in the optical device 1 are expressed by the following formula (8).

$$\left(\frac{w_2}{w_0}\right)^2 = \frac{1}{\left(\frac{\pi w_0^2}{\lambda}\right)^2 P_0^2} \cdot \frac{1}{\left(\frac{\lambda}{\pi w_0^2 P_0^2}\right)^2 P^2 + (1 - d_1 P_2 - d_0 P)^2} \quad (8)$$

Figure 2:
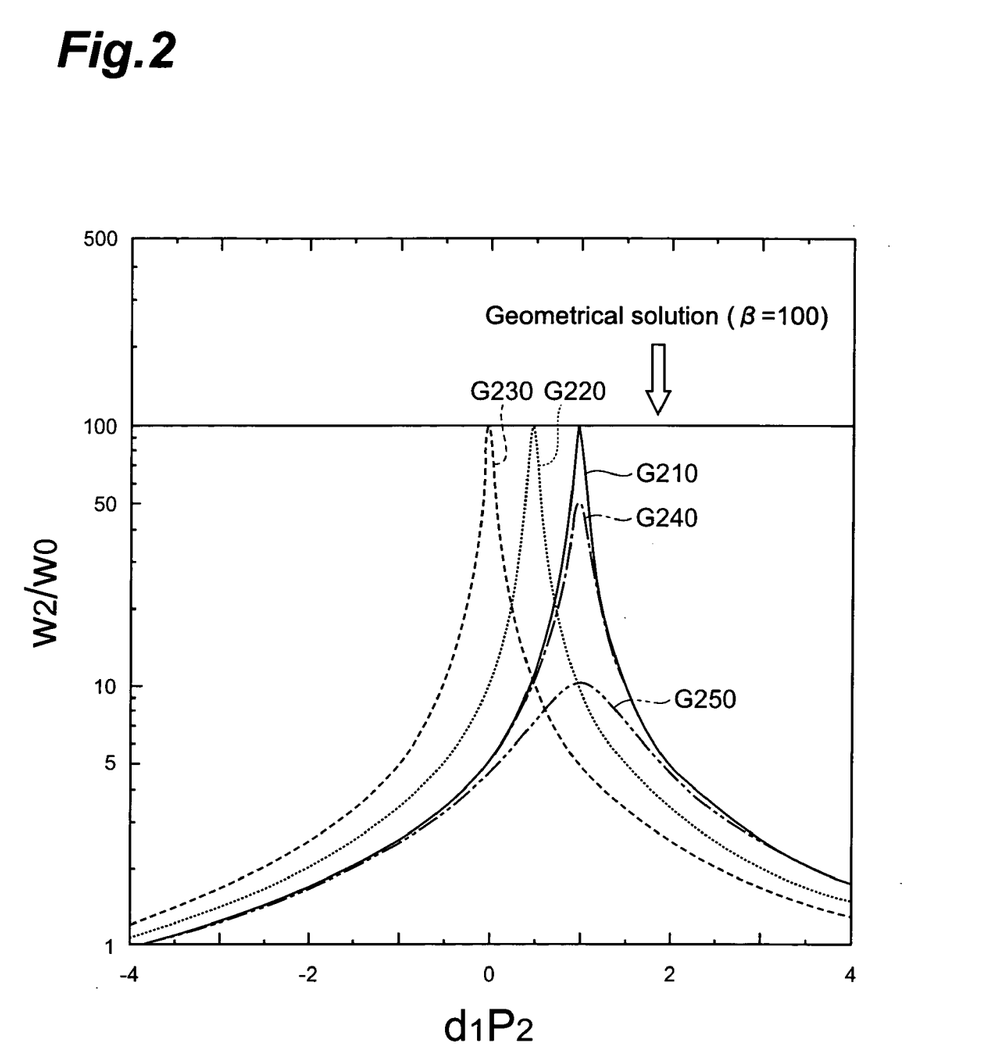
FIG. 2 shows a graph showing a relationship between the beam waist radial ratio ($w_2/w_0$) of the entered and emitted Gaussian beams and the product ($d_1 \cdot P_2$) in an optical device of a first embodiment according to the present invention.

FIG. 2 is a graph showing the relationship between the beam waist radius ratio of the entered and emitted Gaussian beams and the product $(d_1 \cdot P_2)$, in the optical device 1 of the first embodiment according to the present invention. Here, each parameter is set as follows.

$$P_0 = 4 (/\text{mm}) \quad (9a)$$

$$\beta = P_0/P = 100, 50, 10 \quad (9b)$$

$$w_0 = 5 (\mu\text{m}) \quad (9c)$$

$$\lambda = 1.55 (\mu\text{m}) \quad (9d)$$

$$\alpha = 1 - d_0 P = 0, \tfrac{1}{2}, 1 \quad (9e)$$

In FIG. 2, the graph G210 indicates the relationship when setting the parameter $\beta$ at 100 and the parameter $\alpha$ at 1, the graph G220 indicates the relationship when setting the parameter $\beta$ at 100 and the parameter $\alpha$ at ½, the graph G230 indicates the relationship when setting the parameter $\beta$ at 100 and the parameter $\alpha$ at 0, the graph G240 indicates the relationship when setting the parameter $\beta$ at 50 and the parameter $\alpha$ at 1, and the graph G250 indicates the relationship when setting the parameter $\beta$ at 10 and the parameter $\alpha$ at 1.

As can be seen from FIG. 2, even though the refracting power P of the second optical system 20 is constant, the beam waist radius ratio $(w_2/w_0)$ of the entered and emitted Gaussian beams in the optical device 1 is greatly dependent on the product $(d_1 \cdot P_2)$ of the distance $d_1$ between the front optical system 21 and the refracting power $P_2$ of the rear optical system 22, and thereby the beam waist radius ratio $(w_2/w_0)$ can be sufficiently reduced as compared with the geometrical-optical lateral magnification. In other words, the beam waist radius $w_2$ of the Gaussian beam $L_2$ emitted from the rear optical system 22 and the second position $Z_2$ are respectively set at desirable values, based on the product $(d_1 \cdot P_2)$. By setting the product $(d_1 \cdot P_2)$ at the suitable value, the beam waist radius $w_2$ of the emitted Gaussian beam $L_2$ can be sufficiently reduced rather than the beam waist radius determined on the basis of geometrical-optical lateral magnification. To sufficiently reduce the beam waist radius $w_2$ of the emitted Gaussian beam $L_2$, it is preferable that the absolute value of the product $(d_1 \cdot P_2)$ becomes larger, for example 2 or more, more preferably 3 or more.

The position (second position $Z_2$) where the beam waist of the Gaussian beam $L_2$ emitted from the second optical system 20 exists is different from a geometrical-optical focal point, and therefore the optical distance $d_2$ between the rear optical system 22 and the second position $Z_2$ can take a negative value (namely, a virtual image system).

When the distance $d_2$ is set negative, a lens system forming a beam waist in a real space can not be configured. That is, it is necessary that the distance $d_2$ is set positive. The distance $d_2$ is expressed by the following formula (10).

$$d_2 = \frac{-\left(\frac{\pi w_1^2}{\lambda}\right)(1 - d_1 P_1)P^2 - (d_0 + d_1 - d_0 d_1 P_1)(1 - d_1 P_2 - d_0 P)}{\left(\frac{\pi w_1^2}{\lambda}\right)^2 P^2 + (d_0 + d_1 - d_0 d_1 P_1)^2} \quad (10)$$

As calculating a condition that the distance $d_2$ becomes positive from this formula (10), it can be seen that the following formula (11) should be satisfied.

$$d_1 P_2 > \alpha \quad (11)$$

Since the optical distance d1 between the front optical system 21 and the rear optical system 22 is positive to satisfy the condition of formula (11), the refracting power $P_2$ of the rear optical system 22 should be also positive value. Namely, in order to realize the optical device 1 as a real system and to sufficiently reduce the beam waist radius $w_2$ of the emitted Gaussian beam $L_2$, it is necessary that the refracting power $P_2$ of the rear optical system 22 is a large positive value.

In addition, as modifying the above formula (1), the refracting power $P_1$ of the front optical system 21 is expressed by the following formula (12).

$$P_1 = \frac{P - P_2}{1 - d_1 P_2} = \frac{\frac{c}{d_1} - P}{C - 1}, (C = d_1 P_2) \quad (12)$$

It can be seen that the value of C is larger than 1 from the formula (12). That is, in order to sufficiently reduce the beam waist radius $w_2$ of the emitted Gaussian beam $L_2$, it is necessary the refracting power $P_1$ of the front optical system should be also positive value.

For example, in the second optical system 20, the refracting power $P_1$ of the front optical system 21 is set at 0.0267/mm, the refracting power $P_2$ of the rear optical system 22 is set at 0.05/mm, and the distance $d_1$ between the front optical system 21 and the rear optical system 22 is set at 50 mm. Further, the refracting power $P_0$ of the first optical system 10 is set at 1/mm, the parameter $\alpha$ in the above formula (9e) is set at 1, and the geometrical-optical lateral magnification $\beta$ of the optical device 1 is set at 100. Under this condition, the value of the product $(d_1 \cdot P_2)$ is 2.5, and the beam waist radial ratio $(w_2/w_0)$ of the entered and emitted Gaussian beam is approximately 3. This ratio is very small as compared with the geometrical-optical lateral magnification $\beta$.

Thus, in order to reduce the beam waist radius $w_2$ of the emitted Gaussian beam, it is preferable that each of the first optical system 10, the front optical system 21 and the rear optical system 22 has a sufficient small distortion. Therefore, each of the first optical system 10, the front optical system 21 and the rear optical system 22 preferably comprises a combination of plurality of lenses, and also includes an aspheric lens.

In addition, this optical device 1 can comprise other optical elements inserted in an optical path from the first position $Z_0$ to the second position $Z_2$. For example, at the intermediate position $Z_1$ corresponding to a position where the beam waist of the Gaussian beam $L_1$ emitted from the first optical system 10 exists, an optical element such as an optical filter, a wavelength demultiplexer, and the like may be inserted. Even though the optical device 1 has the above configuration, it is preferable that a loss that light is suffered on the optical path from the first position $Z_0$ to the second position $Z_2$ is small. Accordingly, the transmission loss of the lenses only included in the optical system 1 is 0.7 dB or less in C-band (1530 nm–1565 nm) as a signal wavelength band used in general optical communications. In addition, in order to reduce the transmission loss, the lenses included in the optical device 1 is preferably made of a material having a low loss and is preferably coated with a material for reducing a reflection.

Furthermore, in FIG. 1, the principal ray of the emitted Gaussian beam $L_2$ corresponds to the optical axis of the rear optical system 22, but the condition that the principle ray does not corresponds to the optical axis is also permissible. However, it is preferable that the principle ray of the emitted Gaussian beam $L_2$ is in parallel with the optical axis of the rear optical system 22. By this configuration, other optical elements can be provided at the second position $Z_2$ where the beam waist of the emitted Gaussian beam $L_2$ exists.

(Second Embodiment)

Figure 3A:
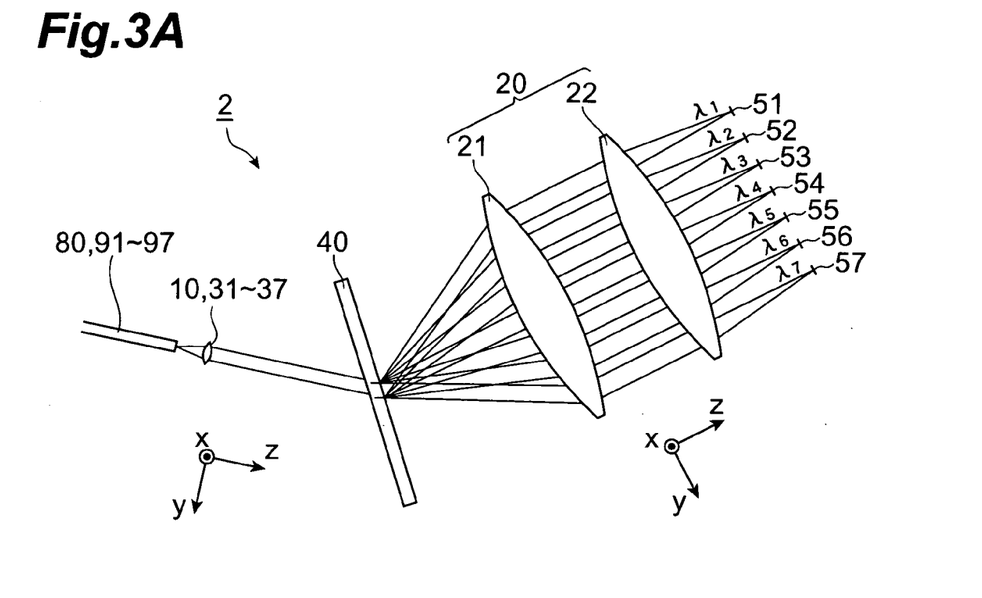
FIGS. 3A and 3B are views showing a configuration of an optical device of a second embodiment according to the present invention.
Figure 3B:
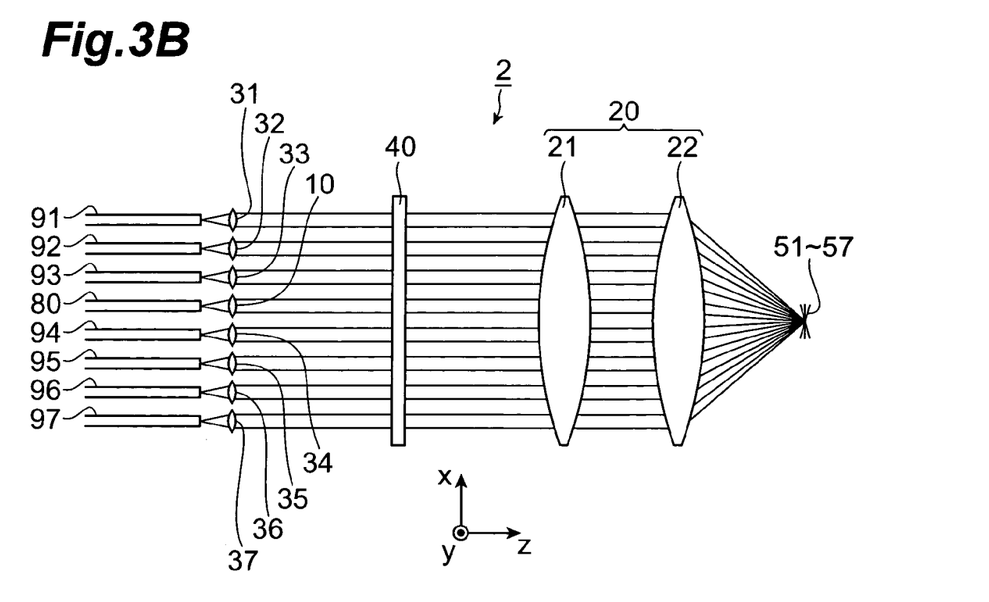

Next, an optical device of a second embodiment according to the present invention will be explained in detail. FIGS. 3A and 3B are views showing a configuration of an optical device of a second embodiment according to the present invention. The optical device 2 according to the second embodiment, shown in FIGS. 3A and 3B, further comprises third optical systems 31–37, a diffraction grating, and mirror reflectors 51–57, in addition to a whole structure of the above-mentioned optical device 1 according to the first embodiment.

Here, FIGS. 3A and 3B show a xyz-rectangular coordinate system for convenience of explanation. In this xyz-rectangular coordinate system, a direction indicated by the z-axis is in parallel with the optical axis of the first optical system 10 in the optical path from the fibers 80, 91–97 to the diffraction grating 40, and is in parallel with the optical axis of the second optical system 20 in the optical path from the diffraction grating 40 to the mirror reflectors 51–57. A direction indicated by the x-axis does not changed between the first optical system 10 and the second optical system 20. FIG. 3A shows the optical device 2 when being observed along a direction parallel to the x-axis. In addition, FIG. 3B shows the optical device 2 when being observed along a direction parallel to the y-axis.

The optical fiber 80 has an end face positioned at the first position $Z_0$ where corresponds to the front focal point of the first optical system 10, and light is emitted from the end face thereof. The light emitted from the end face of the optical fiber 80 can be approximated to a Gaussian beam having a beam waist at the position where the end face is arranged, and propagates along a direction parallel to the z-axis. The first optical system 10 enters the Gaussian beam emitted from the end face of the optical fiber 80, namely the Gaussian beam having a beam waist at the first position $Z_0$, and emits the Gaussian beam having a beam waist at the intermediate position $Z_1$.

The diffraction grating 40 is one of a transparent type, and is provided at the intermediate position $Z_1$ between the first optical system 10 and the second optical system 20.

The diffraction grating 40 enters the Gaussian beam emitted from the first optical system 10, diffracts the Gaussian beam in a diffraction angle depending on a wavelength, and emits the Gaussian beams of the diffracted wavelength components to the second optical system 20. The Gaussian beam of each wavelength component outputted from the diffraction grating 40 to the second optical system 20 travels in parallel with the yz-plane.

The second optical system 20 enters the Gaussian beam of each wavelength component emitted from the diffraction grating 40, and outputs the Gaussian beam of each wavelength component having a beam waist at the second position $Z_2$.

The second optical system 20 is divided into a front optical system 21 and a rear optical system 22 apart from each other at a predetermined distance. The principle ray of the Gaussian beam of each wavelength component emitted from the second optical system 20 is preferably in parallel with the optical axis of the second optical system 20. By this configuration, the mirror reflectors 51–57 can be provided at the second position $Z_2$ where the beam waist of the emitted Gaussian beam exists.

The mirror reflectors 51–57 are respectively arranged along a direction parallel to the y-axis at the position (second position $Z_2$) where the beam waist of the Gaussian beam of each wavelength component emitted from the second optical system 20. Each reflecting surface of the mirror reflectors 51–57 is in parallel with the y-axis. In addition, the tilted angle of each reflecting surface of the mirror reflectors 51–57 can be varied while focusing around the line passing through the second position $Z_2$ and parallel to the y-axis.

The mirror reflector 51 reflects the Gaussian beam with the wavelength $\lambda_1$, emitted from the second optical system 20, into the second optical system 20 again. The mirror reflector 52 reflects the Gaussian beam with the wavelength $\lambda_2$, emitted from the second optical system 20, into the second optical system 20 again. The mirror reflector 53 reflects the Gaussian beam with the wavelength $\lambda_3$, emitted from the second optical system 20, into the second optical system 20 again. The mirror reflector 54 reflects the Gaussian beam with the wavelength $\lambda_4$, emitted from the second optical system 20, into the second optical system 20 again. The mirror reflector 55 reflects the Gaussian beam with the wavelength $\lambda_5$, emitted from the second optical system 20, into the second optical system 20 again. The mirror reflector 56 reflects the Gaussian beam with the wavelength $\lambda_6$, emitted from the second optical system 20, into the second optical system 20 again. Furthermore, the mirror reflector 57 reflects the Gaussian beam with the wavelength $\lambda_7$, emitted from the second optical system 20, into the second optical system 20 again.

Each of the third optical systems 31–37 enters the associated Gaussian beam of the demultiplexed wavelength component, having passed through the second optical system 20 and the diffraction grating 40 after being reflected by the associated of the mirror reflectors 51–57, and emits the Gaussian beam having a beam waist at the third position corresponding to a back focal point. Here, each optical axis of the third optical systems 31–37 is not necessary to be in parallel with the optical axis of the first optical system 10, but it is set so as to be in parallel with the principle ray of the Gaussian beam entered from the diffraction grating 40. By this, a superior optical coupling coefficient can be achieved.

The optical fiber 91 has an end face at the back focal point of the third optical system 31, and the Gaussian beam emitted from the third optical system 31 is entered onto the end face thereof. The optical fiber 92 has an end face at the back focal point of the third optical system 32, and the Gaussian beam emitted from the third optical system 32 is entered onto the end face thereof. The optical fiber 93 has an end face at the back focal point of the third optical system 33, and the Gaussian beam emitted from the third optical system 33 is entered onto the end face thereof. The optical fiber 94 has an end face at the back focal point of the third optical system 34, and the Gaussian beam emitted from the third optical system 34 is entered onto the end face thereof. The optical fiber 95 has an end face at the back focal point of the third optical system 35, and the Gaussian beam emitted from the third optical system 35 is entered onto the end face thereof. The optical fiber 96 has an end face at the back focal point of the third optical system 36, and the Gaussian beam emitted from the third optical system 36 is entered onto the end face thereof. Furthermore, the optical fiber 97 has an end face at the back focal point of the third optical system 37, and the Gaussian beam emitted from the third optical system 37 is entered onto the end face thereof.

By setting the titled angle of each reflecting surface of the mirror reflectors 51–57, the optical device 2 can function as an optical demultiplexer or an optical multiplexer. In other words, when the multiplexed light including seven channels of wavelengths $\lambda_1$–$\lambda_7$ propagates through the optical fiber 80 and reaches the end face thereof, the multiplexed light is outputted as a Gaussian beam having a beam waist at the position where the end face of the optical fiber 80 exists and is entered into the first optical system 10. The light emitted from the first optical system 10 is entered into the diffraction grating 40 as a Gaussian beam having a beam waist at the position where the diffraction grating 40 is arranged, and is diffracted by the diffraction grating 40 in the diffraction angle depending on a wavelength. The wavelength components diffracted by the diffraction grating 40 is entered into the second optical system 20. And, each of the wavelength components emitted second optical system 20 is a Gaussian beam having a beam waist at the position where the reflecting surface of the associated one of the mirror reflectors 51–57 is arranged, and the Gaussian beam reaching the reflecting surface is reflected in the reflecting surface.

The light of wavelength $\lambda_1$ reflected by the mirror reflector 51 reaches the end face of the optical fiber 91 via the second optical system 20, the diffraction grating 40 and the third optical system 31, and enters into the optical fiber 91 through the end face thereof, and propagates through the optical fiber 91. The light of wavelength $\lambda_2$ reflected by the mirror reflector 52 reaches the end face of the optical fiber 92 via the second optical system 20, the diffraction grating 40 and the third optical system 32, and enters into the optical fiber 92 through the end face thereof, and propagates through the optical fiber 92. The light of wavelength $\lambda_3$ reflected by the mirror reflector 53 reaches the end face of the optical fiber 93 via the second optical system 20, the diffraction grating 40 and the third optical system 33, and enters into the optical fiber 93 through the end face thereof, and propagates through the optical fiber 93. The light of wavelength $\lambda_4$ reflected by the mirror reflector 54 reaches the end face of the optical fiber 94 via the second optical system 20, the diffraction grating 40 and the third optical system 34, and enters into the optical fiber 94 through the end face thereof, and propagates through the optical fiber 94. The light of wavelength $\lambda_5$ reflected by the mirror reflector 55 reaches the end face of the optical fiber 95 via the second optical system 20, the diffraction grating 40 and the third optical system 35, and enters into the optical fiber 95 through the end face thereof, and propagates through the optical fiber 95. The light of wavelength $\lambda_6$ reflected by the mirror reflector 56 reaches the end face of the optical fiber 96 via the second optical system 20, the diffraction grating 40 and the third optical system 36, and enters into the optical fiber 96 through the end face thereof, and propagates through the optical fiber 96. Furthermore, the light of wavelength $\lambda_7$ reflected by the mirror reflector 57 reaches the end face of the optical fiber 97 via the second optical system 20, the diffraction grating 40 and the third optical system 37, and enters into the optical fiber 97 through the end face thereof, and propagates through the optical fiber 97.

In the optical path from the mirror reflector 51 to the end face of the optical fiber 91, the light with the wavelength of $\lambda_1$ travels as a Gaussian beam, the Gaussian beam having beam waists at positions where the reflecting surface of the mirror reflector 51, the diffraction grating 40 and the optical fiber 91 are respectively arranged. And, the relationship between the third optical system 31 and the second optical system 20 is similar to that between the first optical system 10 and the second optical system 20 in the first embodiment. The Gaussian beams of other wavelength components $\lambda_2$–$\lambda_7$ have the same features as the above-mentioned Gaussian beam of the wavelength component $\lambda_1$.

As described above, the optical device 2 can function as an optical demultiplexer. In this case, the optical device 2 demultiplexes the light emitted from the end face of the optical fiber 80 into plurality of wavelength components, and enters the wavelength components onto the associated end faces of the optical fibers 91–97. In contrast, in the case that light travels in a direction opposite to the above-mentioned case, the optical device 2 can function as an optical multiplexer. In this case, the optical device 2 multiplexes the wavelength components emitted from the end faces of the optical fibers 91–97, and enters these wavelength components onto the end face of the optical fiber 80.

The first optical system 10 and the second optical system 20 included in the optical device 2 have the same structures as those in the optical device 1 according to the first embodiment. Namely, the optical fiber 80 as an entrance port is arranged at the front focal point (first position $Z_0$) of the first optical system 10, and the mirror reflectors 51–57 are arranged at the associated back focal points (second position $Z_2$) of the second optical system 20. Accordingly, since the beam waist radius ratio of the entered and emitted Gaussian beams is smaller than a geometrical-optical lateral magnification as expressed in the formulas (3A) and (3B), the diameters of the emitted Gaussian beams at the reflecting surfaces of the mirror reflectors 51–57 can be effectively reduced.

The mirror reflectors 51–57 can be produced by MEMS technology, and thereby the optical device 2 can become small. In addition, the optical device 2 can broaden a wavelength bandwidth per one channel and can also increase the number of channels (namely, the number of entrance/emission ports).

In this embodiment, the number of the entrance/emission ports (corresponding to the optical fibers 80, 91–97) was eight, and the number of entrance/emission ports is preferably seven or more. In this case, even though the optical device 2 is small, the number of channels to be optically multiplexed can be increased.

As a preferable configuration, for example, the grating period of the diffraction grating 40 is set at 1 μm, the refracting power $P_0$ of the first optical system 10 is set at 1/mm, and the refracting power P of the second optical system 20 is set at 0.01/mm. The light emitted from the end face of the optical fiber 80 is a 8-channel light with optical frequency spacing 100 GHz (wavelength spacing: 0.8 nm) in C-band, and the mode field diameter of the optical fiber 80 is set at 10 μm, the beam waist radius $w_0$ of the Gaussian beam at the position (first position $Z_0$) where the end face of the optical fiber 80 is arranged is set at 5 μm, and beam waist radius $w_2$ of the Gaussian beam at the position (second position $Z_2$) where the reflecting surfaces of the mirror reflectors 51–57 are arranged is set at 15 μm. Furthermore, it is preferable that the arrangement pitch for the mirror reflectors 51–57 is approximately 100 μm.

Figure 4:
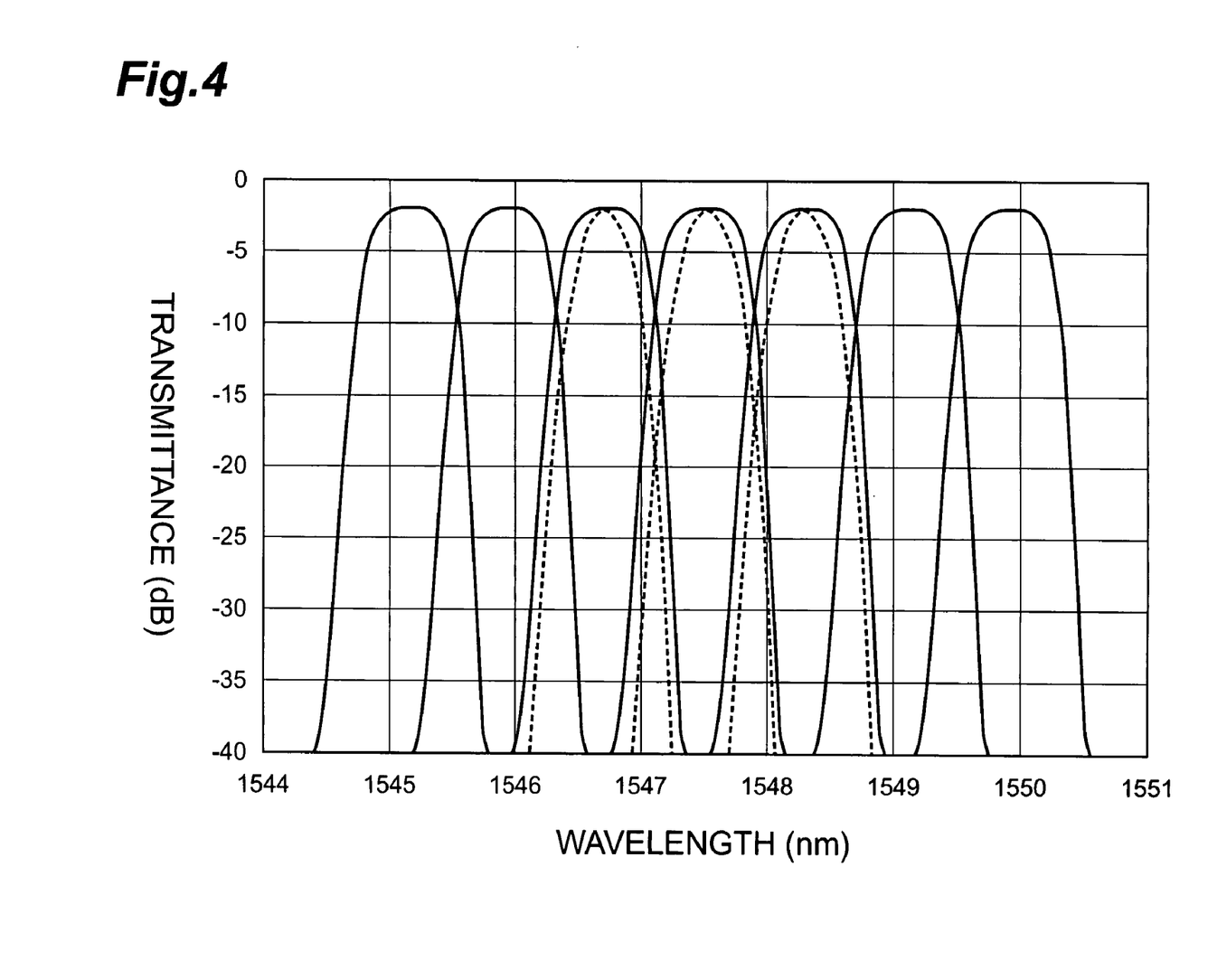
FIG. 4 is a transmission spectrum showing a property of the optical device according to the second embodiment.

FIG. 4 shows a transmission spectrum of the optical device 2 according to the second embodiment. In FIG. 4, the solid line indicates an optical demultiplexing property of the optical device with the above configuration. In addition, a dotted line indicates an optical demultiplexing property of the comparative example in which the focal point is the common geometrical-optical system is coincident with the positions where the reflecting surfaces of the mirror reflectors 51–57 are arranged. As can be seen from FIG. 4, this embodiment corresponding to the solid line has a broader wavelength bandwidth as compared with the comparative example corresponding to the dotted line. In general, the numerical aperture of the end face of the optical fiber is 0.12, the focal length of the first optical system 10 is 1 mm, the diameter of the Gaussian beam between the first optical system 10 and the second optical system 20 is 0.24 mm (=0.12×2×1 mm). Therefore, the optical device 2 can increase the number of entrance/emission ports without increasing the size of the optical device 2.

Furthermore, as described above, each of the mirror reflectors 51–57 preferably has a reflecting surface whose tilted angle can be varied. In this case, the wavelength components through the end faces of the optical fibers 91–97 can be varied, and the optical device 2 having variable entrance/emission ports can be realized.

(Modification)

The present invention is not limited to the above-mentioned embodiments, and can be modified in various manners. The optical device 2 according to the second embodiment has been explained as an optical demultiplexer. However, the optical device 2 can function as an optical filter, an optical signal processing apparatus such as a dispersion adjustor, and the like while having the same structure as described above.

For example, by inserting an optical loss suffering element suffering a loss to light traveling the optical path from the diffraction grating 40 to the third optical systems 31–37, an optical filter suffering a loss in accordance with a wavelength can be realized. This optical filter can function as a gain equalizer for equalizing a gain of an optical amplifier. When the loss suffered by the optical loss suffering element (for example, crystalline liquid element) can be varied, the transmission spectrum of this filter also becomes variable. Or, even when the loss suffered by the optical loss suffering element is fixed, the transmission spectrum of this filter can become variable under the condition that the losses of the optical paths from the mirror reflectors 51–57 to the third optical system 31–37 are set so as to be different from each other. The loss setting can be performed by respectively changing the tilted angles of the reflecting surfaces of the mirror reflectors 51–57.

As making each reflecting surface of the mirror reflectors 51–57 curved surface, a dispersion adjustor, which can adjust a chromatic dispersion of light entering into each of the mirror reflectors 51–57, can be realized. In other words, the light to be incident on each reflecting surface of the mirror reflectors 51–57 generally has an expansion. That is, of the wavelength components, the central wavelength component is incident on the center of the reflecting surface, and the wavelength component far from the center wavelength is incident on a position far from the center of the reflecting surface. Therefore, by making the reflecting surface have a curved shape, the light reflected by the reflecting surface becomes to have a group delay, and thereby the chromatic dispersion of the light can be adjusted. In addition, if the curved shape of the reflecting surface is variable, the amount of dispersion adjustment can be varied. Even though thus mirror reflector has a curved variable reflecting surface, it can be manufactured by MEMS technology.

These optical filter and optical signal processing apparatus such as a dispersion adjustor can be constituted by the first optical system and the second optical system in similar to the above-mentioned embodiment. That is, a beam diameter in a signal processing section can be set small and thereby the wavelength optical resolution can be enhanced. Further, a high-accuracy optical signal processing can be performed.

In the second embodiment, the arrangement direction for the third optical systems 31–37 and the optical fibers 91–97 can be optionally determined. Namely, in the above-mentioned configuration, both of the third optical systems 31–37 and the optical fibers 91–97 are arranged along a direction (corresponding to a direction parallel to the x-axis) orthogonal to the wavelength demultiplexing direction of the diffraction grating 40, but these are allowed to be arranged along the wavelength demultiplexing direction (corresponding to a direction parallel to the y-axis) of the diffraction grating 40. In accordance with the arrangement of the third optical systems 31–37 and the optical fibers 91–97, the tilted angles of the reflecting surface of the mirror reflectors 51–57 are properly adjusted.

In addition, the number of channels in the above-mentioned embodiment was seven, but increasing the number of mirror reflectors can also increase the number of channels. In this case, plurality of wavelengths can be coupled to one port. Furthermore, in the case that optical fibers are prepared as an entrance port, the optical device according to the present invention can function as a restructurable optical Add Drop Multiplexer (ADM).

The diffraction grating as a wavelength demultiplexer performing wavelength-demultiplexing is, in the above-mentioned embodiment, one of a transparent type, but it may be one of a reflection type. As the wavelength demultiplexer, photonic crystal may be used in stead of the diffraction grating. When the multiplexed light with plurality of wavelengths is incident thereon, the photonic crystal can emit the wavelength components into spatially different optical paths in accordance with a wavelength. That is, this photonic crystal can have a function similar to that of the diffraction grating. Furthermore, the number of channels, the number of entrance/emission ports and the number of mirror reflectors are not limited to the value explained in the above-mentioned embodiment.

As described above, in accordance with the present invention, the beam waist radial ratio between the entered and emitted Gaussian beams can be reduced as compared with a geometrical-optical lateral magnification, and the diameter of the emitted Gaussian beam can be become smaller. That is, even though the optical device is small, the wavelength bandwidth per one channel can be broadened, and the number of entrance/emission ports can be also increased.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical system provided between a first and second positions apart from each other at a predetermined distance, said optical system comprising:
    a light entrance surface which faces the first position and on which a Gaussian beam, having a beam waist with a radius of $w_1$ at the first position, is incident; and
    a light emission surface which faces the second position and from which a Gaussian beam, having a beam waist with a radius of $w_2$ at the second position, is emitted,
    wherein a radial ratio ($w_2/w_1$) of the beam waists at the first and second positions is smaller than a geometrical-optical lateral magnification of said optical system.

2. An optical system according to claim 1, wherein said optical system comprises a front optical system including said light entrance surface, and a rear optical system including said light emission surface, said front and rear optical systems being apart from each other at a predetermined distance.

3. An optical system according to claim 1, wherein said optical system includes plurality of lenses, and a total transmission loss of said lenses only is 0.7 dB or less in C-band.

4. An optical system according to claim 2, wherein a position and a radius of the beam waist of the Gaussian beam emitted from said rear optical system are respectively set on the basis of the product of a distance from said front optical system to said rear optical system and a refracting power of said rear optical system.

5. An optical system according to claim 2, wherein each of said front and rear optical systems has a positive refracting power.

6. An optical system according to claim 2, wherein a principle ray of the Gaussian beam emitted from said rear optical system is in parallel with an optical axis of said rear optical system.

7. An optical devices including an optical system according to claim 1.

8. An optical device, comprising:
(1) a first optical system provided between a first and second positions apart from each other at a predetermined distance, said first optical system having:
    a first light entrance surface which faces the first position and on which a Gaussian beam, having a beam waist with a radius of $w_0$ at the first position, is incident; and
    a first light emission surface which faces an intermediate position between the first and second positions, and from which a Gaussian beam, having a beam waist with a radius of $w_1$ at the intermediate position, is emitted; and
(2) a second optical system provided between the intermediate and second positions, said second optical system having:
    a second light entrance surface which faces the intermediate position and on which the Gaussian beam emitted from said first optical system, is incident; and a second light emission surface which faces the second position and from which a Gaussian beam having a beam waist, whose radius becomes $w_2$ at the second position, is emitted, wherein a radial ratio ($w_2/w_0$) of the beam waists at the first and second positions is smaller than a total geometrical-optical lateral magnification of said first and second optical systems.

9. An optical device according to claim 8, wherein said second optical system comprises a front optical system including said second light entrance surface, and a rear optical system including said second light emission surface, said front and rear optical systems being apart from each other at a predetermined distance.

10. An optical device according to claim 8, wherein said optical device includes plurality of lenses, and a total transmission loss of said lenses only is 0.7 dB or less in C-band.

11. An optical device according to claim 9, wherein a position and a radius of the beam waist of the Gaussian beam emitted from said rear optical system are respectively set on the basis of the product of a distance from said front optical system to said rear optical system and a refracting power of said rear optical system.

12. An optical device according to claim 9, wherein each of said front and rear optical systems has a positive refracting power.

13. An optical device according to claim 9, wherein a principle ray of the Gaussian beam emitted from said rear optical system is in parallel with an optical axis of said rear optical system.

14. An optical device according to claim 9, further comprising:

a mirror reflector provided at the second position, said mirror reflector reflecting the Gaussian beam, having emitted from said second optical system, toward said second optical system again; and a third optical system provided at a position where the Gaussian beam, having passed through said second optical system after being reflected by said mirror reflector, reaches, said third optical system comprising a third light entrance surface on which the Gaussian beam reflected by said mirror reflector is incident, and a third light emission surface from which a Gaussian beam having a beam waist at a third position different from the second position is emitted, wherein a principle ray of the Gaussian beam emitted from said third optical system is in parallel with an optical axis of said third optical system.

15. An optical device according to claim 9, further comprising a wavelength demultiplexer provided between said first and second optical systems.

16. An optical device according to claim 15, wherein said wavelength demultiplexer includes a diffraction grating.

17. An optical device according to claim 15, further comprising:

plurality of mirror reflectors provided at positions where respectively correspond to the second position for each of the associated wavelength components having passed through said second optical system after being demultiplexed by said wavelength demultiplexer, each of said mirror reflectors reflecting the Gaussian beam of the associated wavelength component, having emitted from the second optical system, toward said second optical system again; and plurality of third optical systems provided at positions where the Gaussian beams of the associated wavelength components, having passed through said second optical system and said wavelength demultiplexer after being reflected by said associated mirror reflectors, respectively reach, each of said third optical systems comprising a third light entrance surface on which the Gaussian beam of the associated wavelength component, having passed through said second optical system again from said associated mirror reflector, is incident, and a third light emission surface from which Gaussian beam of the associated wavelength component having a beam waist at a third position is emitted.

18. An optical device according to claim 17, wherein each of said mirror reflectors has a reflecting surface whose tilted angle can be varied.

19. An optical device according to claim 15, wherein said optical device has seven or more entrance/emission ports.

* * * * *